United States Patent [19]
Zaiser

[11] Patent Number: 5,915,439
[45] Date of Patent: Jun. 29, 1999

[54] APPARATUS FOR CLEANING CYLINDRICAL AIR FILTERS

[76] Inventor: Harold W. Zaiser, 5544 Berryman St., Lehigh Acres, Fla. 33971

[21] Appl. No.: 08/880,220

[22] Filed: Jun. 23, 1997

[51] Int. Cl.$^6$ .................................................. B01D 29/06
[52] U.S. Cl. ................................ 15/304; 15/311; 15/345; 55/295; 55/302
[58] Field of Search ........................... 15/304, 310, 311, 15/345; 55/295, 302

[56] References Cited

U.S. PATENT DOCUMENTS

| | | | |
|---|---|---|---|
| 3,765,051 | 10/1973 | Wanat | 15/310 X |
| 3,936,902 | 2/1976 | Shackleton et al. | 15/304 |
| 4,808,234 | 2/1989 | McKay et al. | 15/304 X |
| 4,842,624 | 6/1989 | Barton | 55/302 X |
| 5,305,493 | 4/1994 | Prenn | 15/304 |
| 5,332,448 | 7/1994 | Phillips | 15/304 X |

Primary Examiner—Chris K. Moore

[57] ABSTRACT

An apparatus is disclosed for cleaning filters used in air breathing machinery. The apparatus is adapted to clean filters that are either contaminated or dirty on the inside surface of its filter medium or on the outside. For this purpose, the filter is placed in a first chamber of a housing wherein it is rotatably supported and wherein there is a vacuum established if the filter surface is dirty on the outside and wherein alternatively a vacuum is established on the inside of the filter if the filter is dirty on the inside surface. This establishes the fact that cleaning air moves through the filter medium in the direction of its contamination. In order to aid in dislodging any contaminants, vibrating hammers are provided on the outside or on the inside of the surfaces of the filters. When the filter surface is dirty on the inside surface, a hammer will operate on the outside of the filter surface and if a filter is dirty on its outside surface, the hammer will operate on the inside surface of the filter medium. All operating elements of the apparatus are contained in one housing making the apparatus a stand-alone unit.

12 Claims, 13 Drawing Sheets

APPARATUS FOR CLEANING CYLINDRICAL AIR FILTERS

FIELD OF THE INVENTION

This invention relates to an apparatus for cleaning cylindrical or conical air filters of the type employed in trucks, heavy equipment and other types of machinery.

BACKGROUND OF THE INVENTION

Cylindrical air filters are used in conjunction with a wide variety of air breathing machinery, including trucks and cars, gas turbines, bulldozers, heavy cranes and other heavy equipment. Typically, this type of filter employs a perforated metal frame and an enclosed, generally cylindrical pleated paper filter medium having inside and outside filtering surfaces. Depending upon the configuration of the machinery and their air intakes, some use the filters in an interior filtering mode, while the others are utilizing the exterior surfaces of the filters to filter and thereby clean the incoming air. Most automobiles employ relatively inexpensive filters that are simply replaced and then discarded when they become dirty, However trucks and other heavy equipment usually employ air filters that are relatively large and expensive to replace. Accordingly, various techniques have been developed to clean these large filters which can thereby be reused. Most often, they are washed in suitable solvents and cleaning solutions. Such washing tends to weaken the paper filter medium so that it is significantly less effective when the filter is being reused.

U.S. Pat. No. 4,808,234 describes an attempt to overcome the disadvantages of solvent cleaning filters by using a "dry" cleaning system wherein dirt, debris and other contaminants are dislodged from the filter and are then collected by a vacuum or other suction device. In this patent, air is supplied simultaneously to the inside and outside surfaces of the cylindrical surfaces of the filter to dislodge dirt from the outside surface. Suction collects this dislodged dirt. As the air pressure is applied, the filter is rotated horizontally about its longitudinal axis. There is no way that dirt can be collected from the inside surface of the filter. In our present invention at hand, the machine can be switched to either mode of operation, that is, inside surface cleaning or outside surface cleaning, as will be shown below. Furthermore, in U.S. Pat. No. 4,808,234, the operator must manually reach into the cabinet of the apparatus and hold the filter while securing it to a spindle. This is awkward and hazardous. In the invention at hand, there are certain safety precautions built into the machine which will be described below.

In the filter cleaning apparatus disclosed in U.S. Pat. No. 5,143,529, the air filter is mounted upright in a cabinet. High pressure and opposing air nozzles are mounted for vertical movement along the inner and outer surfaces of the filter to dislodge debris therefrom. Similarly, inner and outer vacuum nozzles are mounted adjacent to and movable with the air nozzles for suctioning the dislodged debris. Although this apparatus facilitates handling and mounting of the filter and cleans both inside and outside filters, it also exhibits a number of serious disadvantages, for one thing it cannot properly clean many tapered filters that are now commercially available because the inside nozzle often cannot move freely through the central opening of such filters. Additionally, the upright filter rotates during the cleaning process. As a result, when an inside filter is being cleaned, centrifugal forces cause the dirt and debris to be pushed tightly into the interior pleats of the filtermedium. this makes cleaning of the inside surface more difficult. Cleaning is also complicated because the interior dirt and debris falls from the paper filter and much of it drops into corners of the filter, which are inaccessible to the force of the vacuum.

Therefore, the filter is not completely cleaned.

In neither of the above described devices can the user select either inside or outside cleaning alone. In U.S. Pat. No. '234 only outside cleaning is possible. In U.S. Pat. No. '529 both types of cleaning are performed on every filter, although virtually all air filters require only one type of cleaning (either inside or outside). None of the above described filter cleaning devices use a vibrating device or hammer by which dirt and debris is dislodged during the cleaning process.

Our previous U.S. Pat. No. 5,584,900, which issued on Dec. 17, 1996, includes such a pneumatic hammer. This U.S. Pat. No. '900 is hereby incorporated in this specification by reference. The invention of this application constitutes an improvement over the apparatus of our previous patent.

OBJECTS OF THE INVENTION

It is therefore an object of the invention to provide an improved apparatus for cleaning air filters of the type used in trucks, heavy equipment and related machinery.

It is a further object of this invention to provide an apparatus for cleaning air filters that may be employed equally effectively for inside and outside cylindrical air filters.

It is a further object of this invention to provide an apparatus for cleaning air filters that exhibits improved performance by horizontally mounting the filter for cleaning so that dirt and debris are not trapped in the filter pleats or in the bottom of the filter canister. It is a further object of this invention to provide an apparatus for cleaning air filters that is effective for use with air filters of virtually all sizes and shapes, including tall and tapered cylindrical air filters.

It is a further object of this invention to provide an apparatus for cleaning air filters that improves operator safety by permitting the filter to be automatically mounted and manipulated for cleaning with minimal manual handling. The filter is merely placed into the apparatus on horizontal receiving arms, whereafter the apparatus automatically places the filter in its operating position after the apparatus is closed for cleaning.

It is a further object of this invention to provide an air filter cleaning apparatus that achieves dislodging and vacuuming of dirt and debris from inside or outside surfaces of the filter.

SUMMARY OF THE INVENTION

This invention is an improvement over our previous U.S. Pat. No. 5,584,900. Instead of placing the filter in a vertical orientation into a cage which is later rotated to place the filter in a horizontal orientation, the filter is initially placed already in a horizontal position on lower stationary receiving arms where after when activated, a pair of upper and lower cradle arms approach each other until sensors sense full contact of the cradle arms on the circumference of the filter to thereby stop the movement. A right hand freely rotating star wheel will now approach the one end of the filter to move the filter into contact with a rotation turntable having a friction surface thereon.

It should also be noted that a simple selector changes the mode of operation, that is, depending on whether the filter is dirty on the inside surface or whether it is dirty on the outside surface. When the filter is dirty on the outside, there is a positive air pressure on the inside of the filter canister and a vacuum or negative pressure on the outside surface. When the filter is dirty on the inside surface of the filter, there is a positive pressure on the outside of the filter canister and a negative pressure on the inside.

At the same time, the mode of hammering is changed as the positive and negative air pressures are being changed. When the outside surface of the filter is being cleaned, a vibrating hammer is operating on the inside surface of the filter and, vice versa, when the inside of the filter is being cleaned, a vibrating hammer is operating on the outside surface of the filter. The hammering operation is occurring at the top dead center of the cylindrical filter while it is rotating. The inside hammer is operating at the bottom dead center of the filter while it is rotating. With each vibrating hammer, there is associated an air nozzle which blows air in the same direction that the hammers are operating.

It is contemplated that the filter cleaning machine be fully enclosed and will enclose all operating devices. It is, therefore, a unitary or stand-alone machine.

DETAILED DESCRIPTION OF THE DRAWINGS

Figure 1:
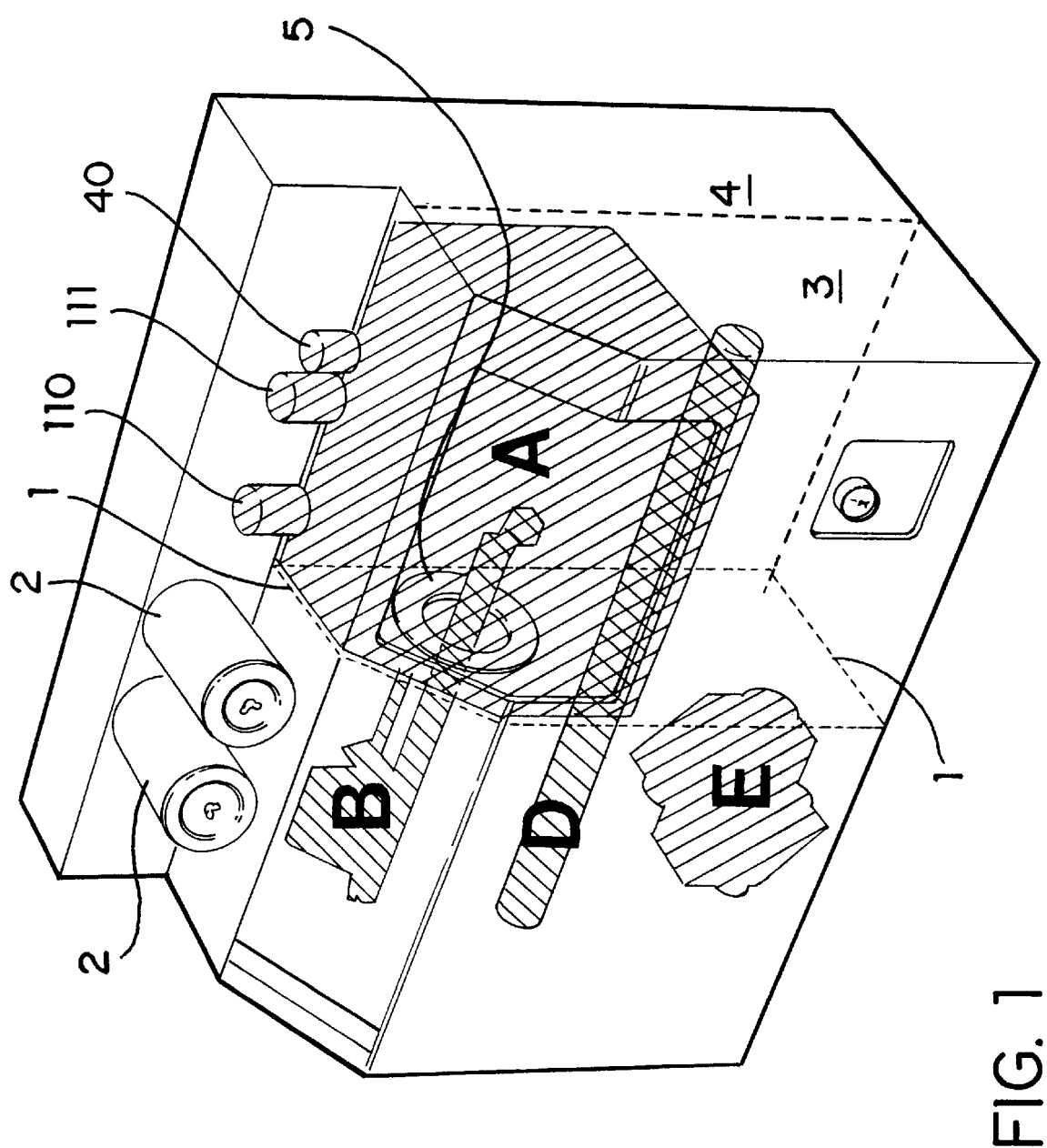
FIG. 1 is a perspective and schematic front view of the overall machine.

FIG. 1 shows the overall schematic layout of the apparatus wherein A is the filter receiving and cleaning chamber. B is the inside filter cleaning device. D is an auger-like brush in the bottom of the cleaning chamber A. E is a vacuum manifold having switchable exit ports. Separating the two chambers A an B is a fire wall marked as 1 which hermetically seals both chambers A and B from each other except for controlled openings. Within the fire wall 1 is mounted a rotatable turntable 5. At the top of the apparatus there are at least two filters 2 at the air exits of the apparatus. also shown are three motors 40, 110 and 111. There is further shown a side wall 3 and schematically a rear chamber wall 4.

All of the above noted elements will be described in detail with their functions as the description progresses below.

Figure 2:
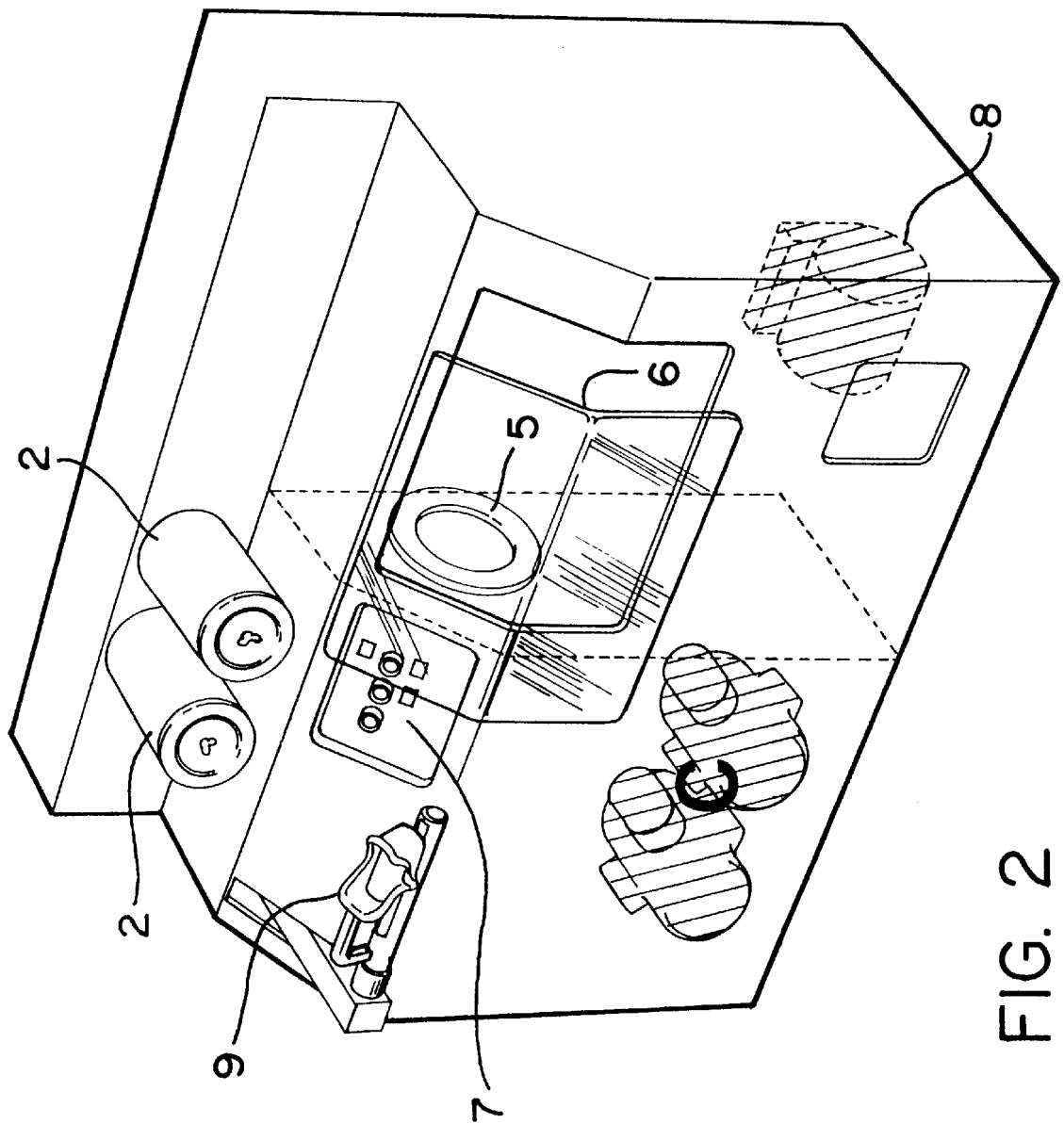
FIG. 2 is another perspective and schematic front view of the overall machine.

FIG. 2 is another perspective and schematic front view of the apparatus wherein like elements are being identified with like reference characters. In the left front bottom chamber there are located two air compressor units marked as C while 8 represents a vacuum pump. The chamber A (FIG. 2) is covered with a sliding door 6 made of clear plastic such as acrylic which matches the outer contour of the apparatus and will hermetically seal the chamber with appropriate rubber seals (not shown). It may be noted at this time that the clear cover always covers the control panel 7 which is only accessible until the cover 6 is completely closed. This represents a safety feature in that the apparatus cannot be started unless the cover is completely closed. Furthermore, the clear cover allows a clear view of the operating elements when the machine is in operation. The elements 9 shown on the left side of the apparatus represent a filter inspection device. As explained in FIG. 1, the schematically shown elements will be explained in greater detail below.

Figure 3:
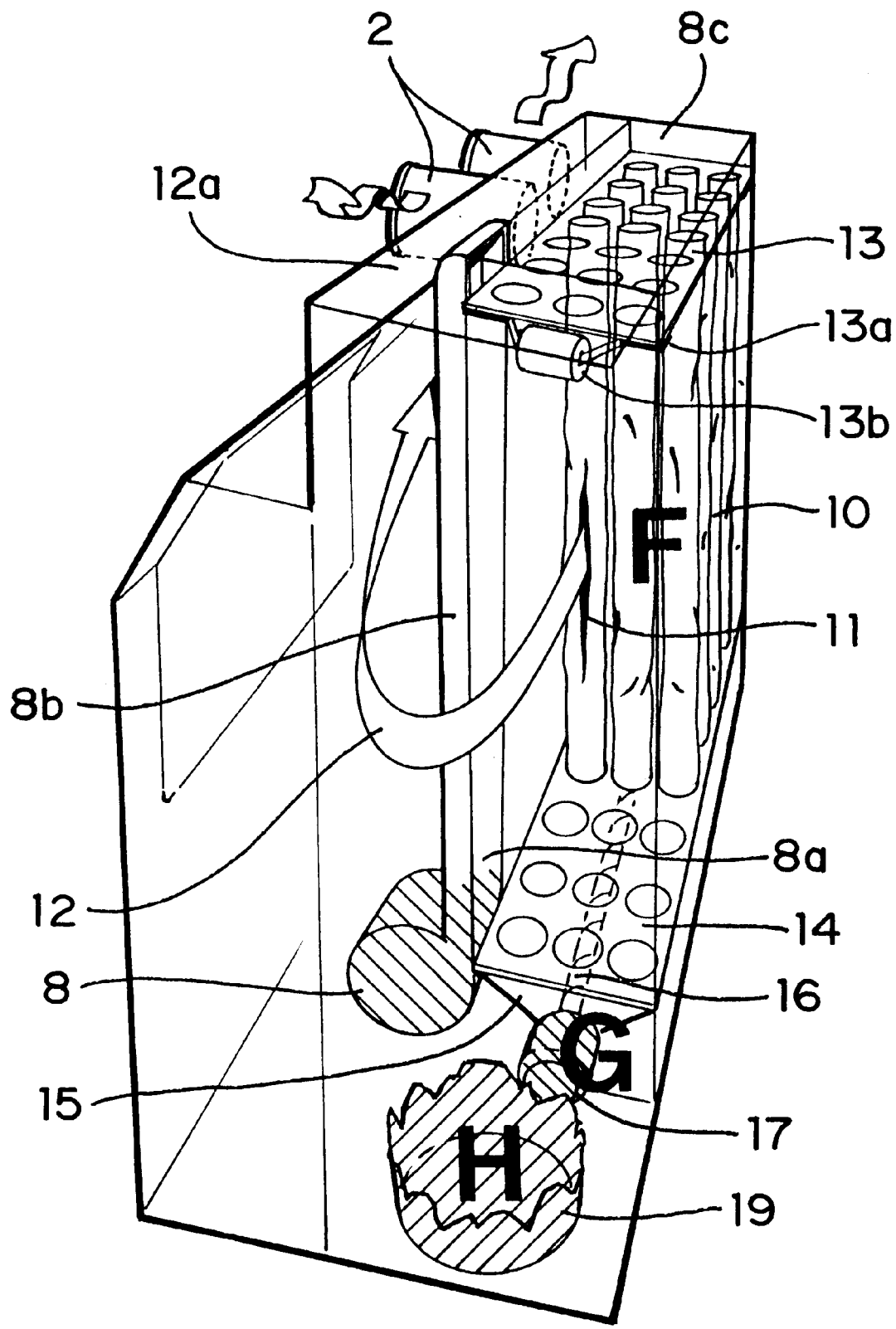
FIG. 3 is a perspective and schematic rear view of the overall machine.

FIG. 3 is a perspective and schematic rear view of the overall apparatus. F shows a chamber having filter bags 10 suspended therein. The upper ends of the filter bags are fastened to a manifold 13 and suspended therefrom. The manifold is vibrated by a vibrating mechanism which includes rubber blocks 13a on which the manifold is supported and a vibrating motor 13b. Such vibrating systems are well known in the art. There is a vacuum pump 8 in the left rear corner of the bag chamber F which at its exit 8a propels air into a duct 8b which is connected thereto which guides the exhausted air to the chamber 8c above the manifold 13. The exhausted air from the vacuum pump 8 is laden with dirt and debris as will be described later on below. The lower ends of the bags are fastened to another manifold 14 below which is a collecting trough 15 having a brush-like auger 16 therein which is driven by motor 17. The apparatus may contain as many as 30 filter bags 10.

In case of a rip in any of the bags, which is simulated at 11, the dirty air is exhausted into exhaust chamber 12a and the final filters 2 of the apparatus will trap the escaping dirt and debris. The left rear chamber H also contains an air compressor tank 19 receiving air from the two air compressors C (FIG. 1). As is well known in the art, such an air tank is necessary when operating with air pressure devices in order to avoid large air pressure fluctuations such as pressure surges and loss of pressure, therefore, any further details of this air pressure system are not shown.

Figure 4:
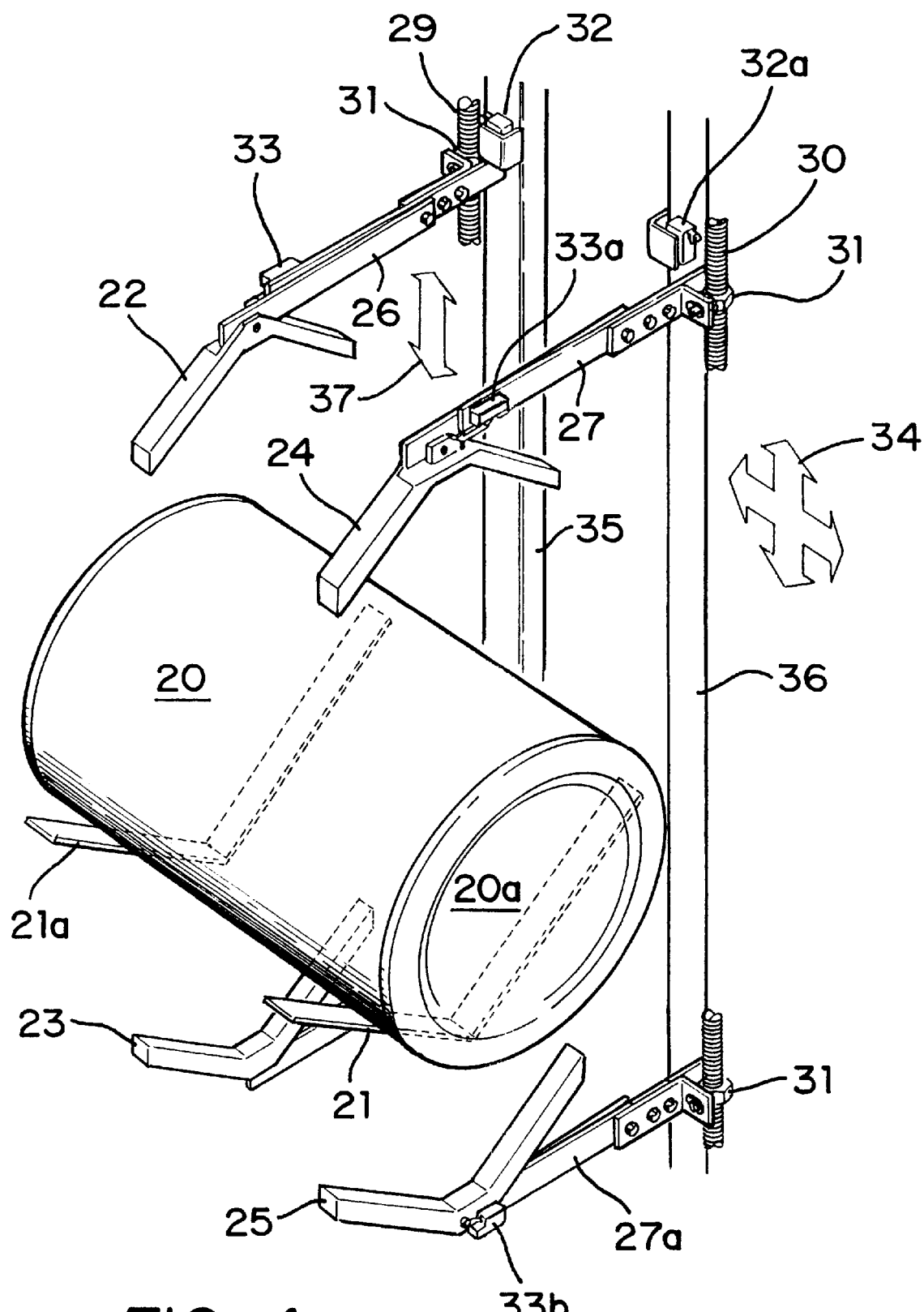
FIG. 4 is a perspective view of the filter centering device.

In FIG. 4 is shown a perspective view of the filter centering device which is located in chamber A (FIG. 1). For the purpose of centering a filter 20 having a closed end 20a to form a canister, there are provided two stationary initial receiving arms 21 and 21a onto which a filter to be cleaned is merely placed. On the left side of FIG. 4, there are shown two centering cradles 22 and 23 which are stationary with respect to any lateral movements. Then there are shown two further centering cradles 24 and 25 which are movable laterally with respect to the first cradles 22 and 23 as shown by arrow 34. Both cradles 22 and 23 are supported by arms 26 and the cradles 24 and 25 are supported by arms 27 and 27a, respectively, in a cantilevered fashion. Both arms 26, 27 and 27a are supported by vertical columns 35 and 36 and are adapted to slide thereon. The arms 26 (the lower arm is not shown) are driven away and toward each other, while sliding on support column 35, by helical screw 29 which at its midpoint is threaded in opposite directions. In the same manner the arms 27 and 27a are driven away and toward each other, while sliding on column 36, by helical screw 30 which at its midpoint is threaded in opposite directions. both screws 29 and 30 are driven by electric motors 110 and 111, respectively, as shown schematically in FIG. 1. Both screws 29 and 30 are received in threaded sleeves 31 which are connected to the arms 26, 27 and 27a. At the rear of arms 26 and 27, there are mounted ascent limit switches 32 and 32a which limit the upward travel of the arms. At the forward end of arms 26 and 27, there are mounted descent limit switches 33 which limit the downward movement or upward movement of arms 27a until contact is made with the circumference of the filter 20 resting on the receiving cradles 21 and 21a. At this point the filter 20 is considered to be centered between the cradles 22, 24 and 25. Because of this arrangement, conical shaped filters can also be cleaned. With a conical filter, the larger end would be placed to the left in FIG. 4 and the smaller diameter end would face to the right in FIG. 4. In this manner, the left hand cradles would stop at the larger diameter first because of the limit switches 33 making contact while the right hand cradles 23 and 24 continue to travel until the limit switches 33a and 33b make contact with the smaller diameter of the conical filter.

Figure 5:
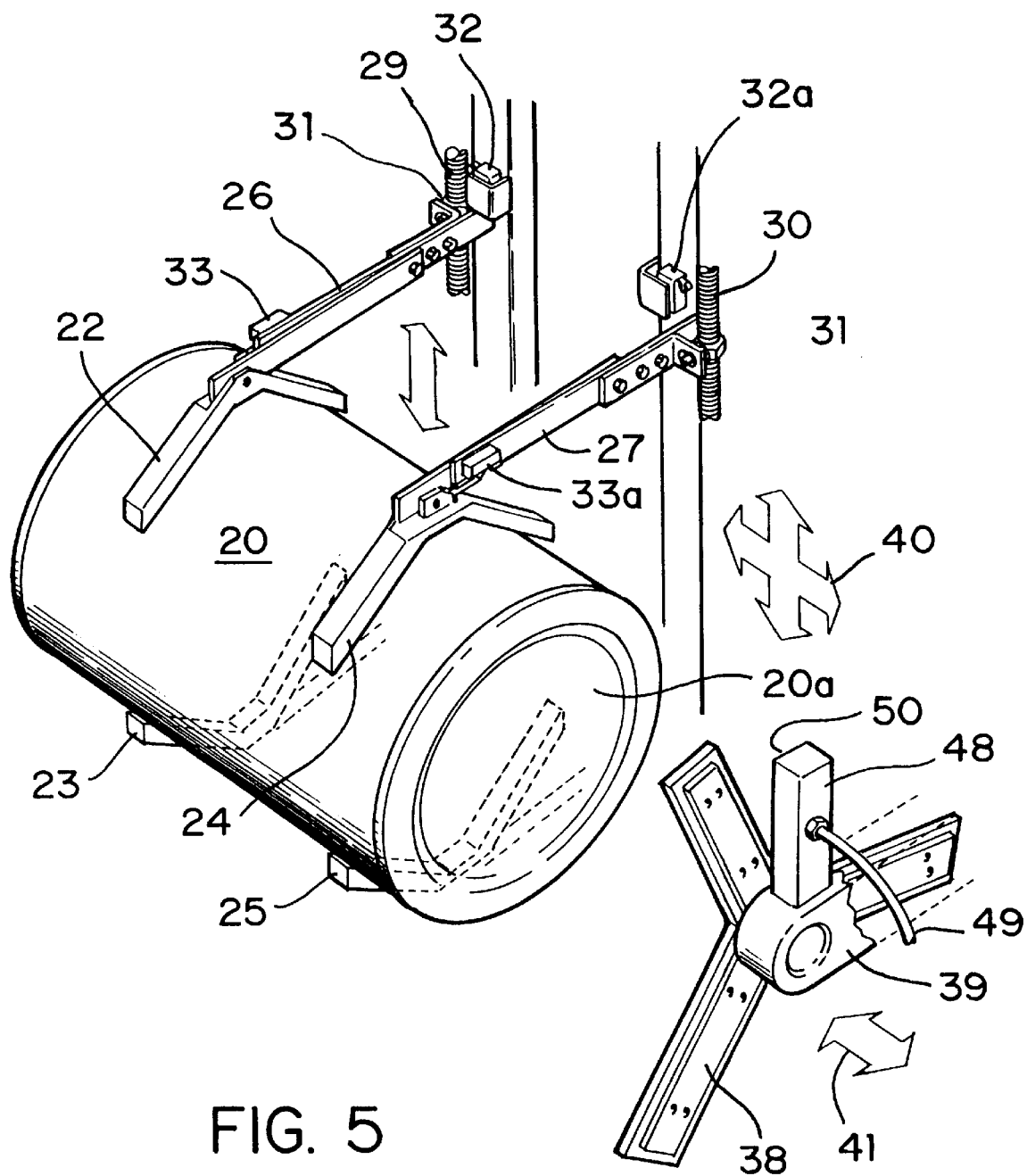
FIG. 5 is a perspective view of the filter after having been centered.

Also, the right hand cradles 24 and 25 with their support column 36 are adapted to travel in a transverse direction as indicated by double arrow 34. This is necessary so that filters having different lengths can be accommodated and cleaned in the apparatus. An extension of column 36 has a platform attached thereto which carries an electric motor 40 (FIG. 1) which has a pinion attached thereto which meshes with a rack supported in the upper machine frame. The latter mentioned elements have not been shown because it is common knowledge that a rack and pinion drive obtain lateral movements between elements. FIG. 5 is a perspective view of the filter 20 after having been centered. To the right of the filter 20, there is now waiting a star wheel 38 being mounted on a support arm 39 which is now ready to move on command in the direction of arrow 41 to make contact with the end 20a of filter 20 to move the same into contact with a turntable 5 shown in FIG. 6. The support arm 39 has attached thereto a column 48 being hollow inside and having an air hose 49 attached thereto which leads to the vacuum manifold E (FIG. 1). The interior of column 48 forms an air inlet as will be described below. The movement of the star wheel will be described later below.

Figure 6:
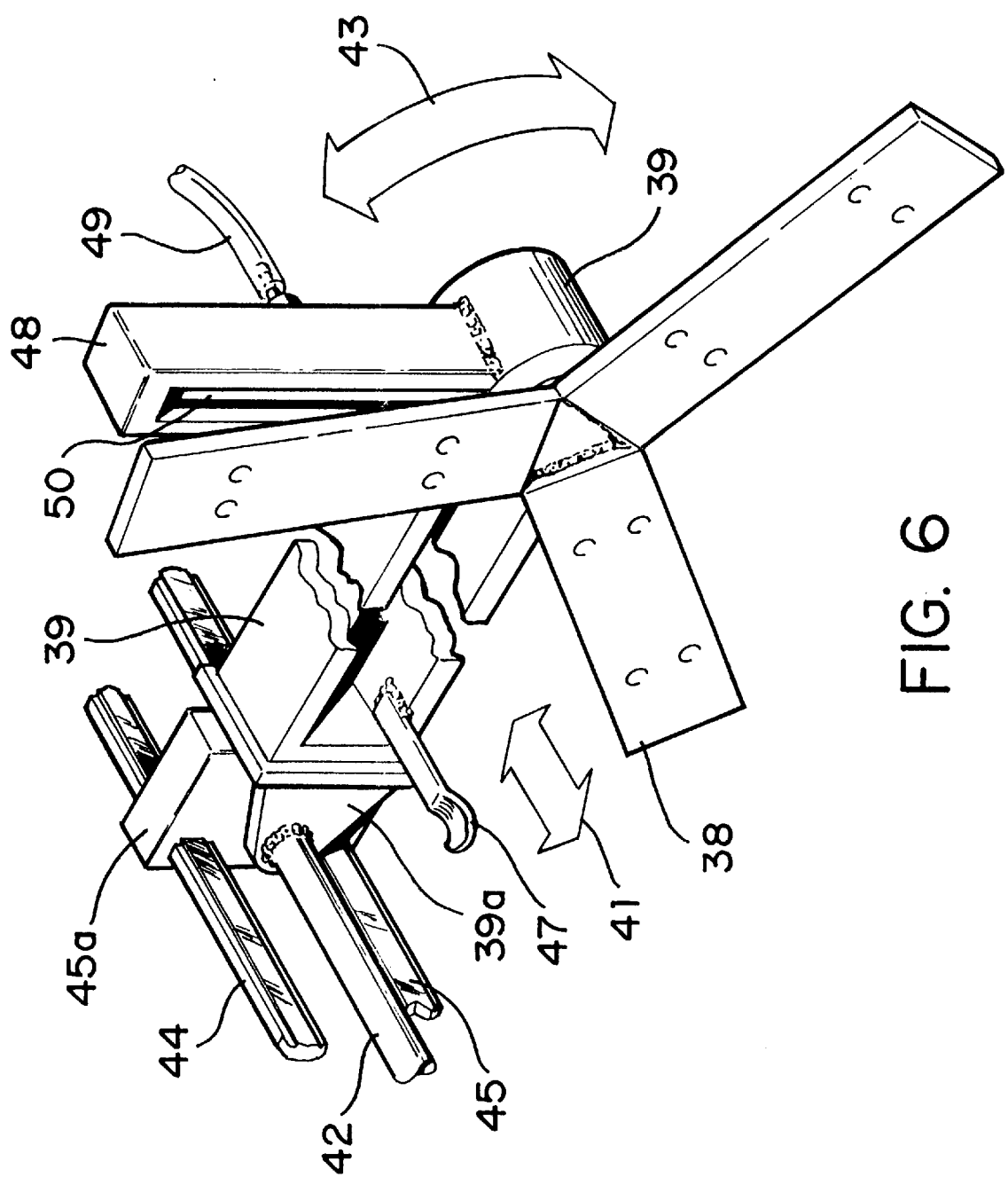
FIG. 6 is a perspective view of the filter star wheel.
Figure 11:
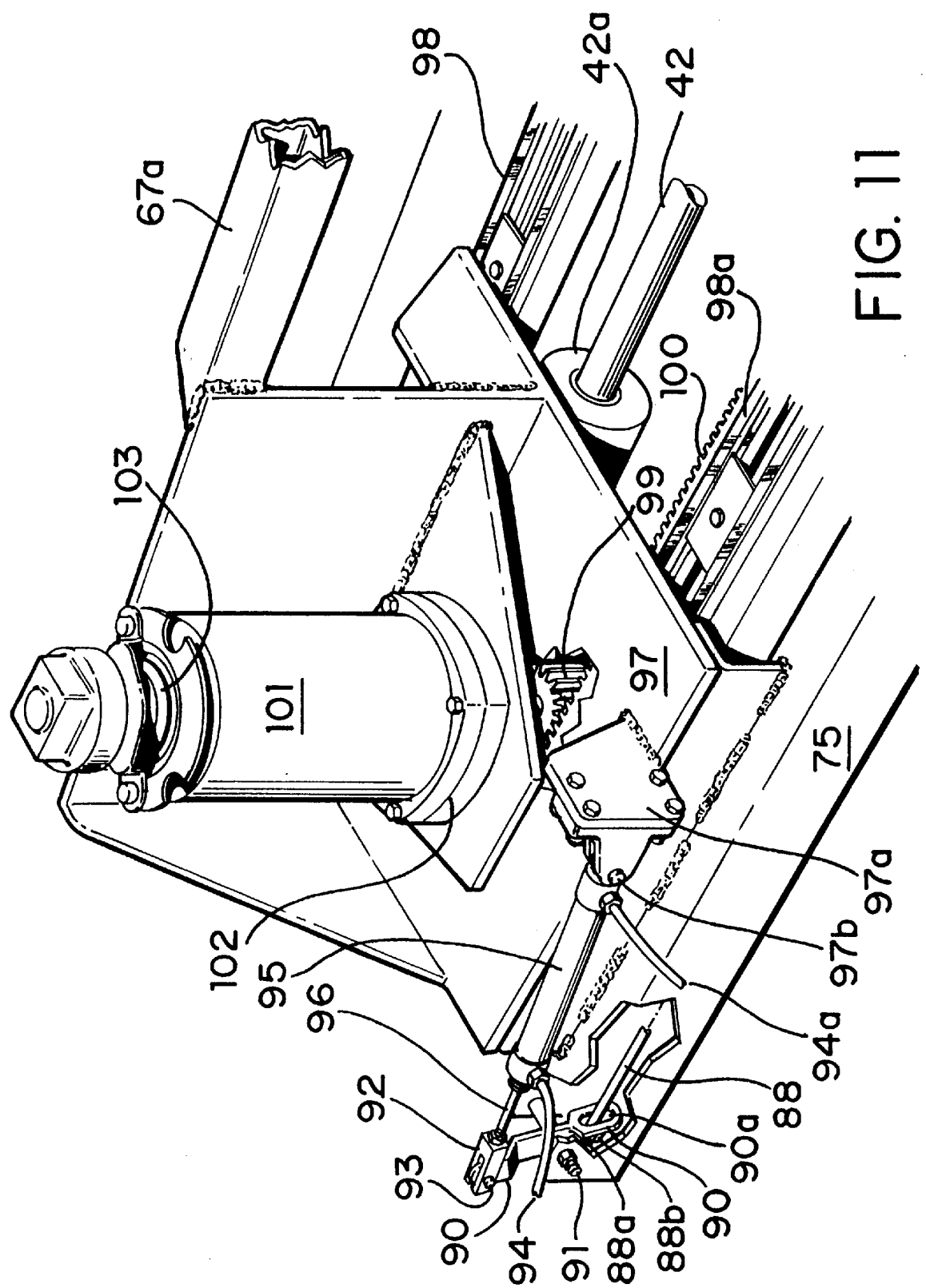
FIG. 11 is a perspective view of the drive mechanism for the inside vibrating hammer.

FIG. 6 is a perspective view of the movement of the star wheel 38. As explained in FIG. 5, the star wheel 38 is supported on a support arm 39 which in turn is attached by way of an extension 39a to a piston rod 42 which rod which will move the star wheel in the direction as indicated by arrow 41 and will be explained later below. The support arm 39 is further supported on a slidingblock 45a which itself is guided in guide channels 44 and 45. The lateral movement of the star wheel 38 assembly, as indicated by arrow 41, is achieved by piston rod 42 which is operated by a piston 42a attached to the machine frame which supports a sliding platform 97 as shown in FIG. 11. as will be explained in connection therewith. The movement is controlled by limit switches such as shown at 47 which will make contact with the filter when the star wheel is in its proper position, that is, after having made contact with end 20a of the filter.

Figure 7:
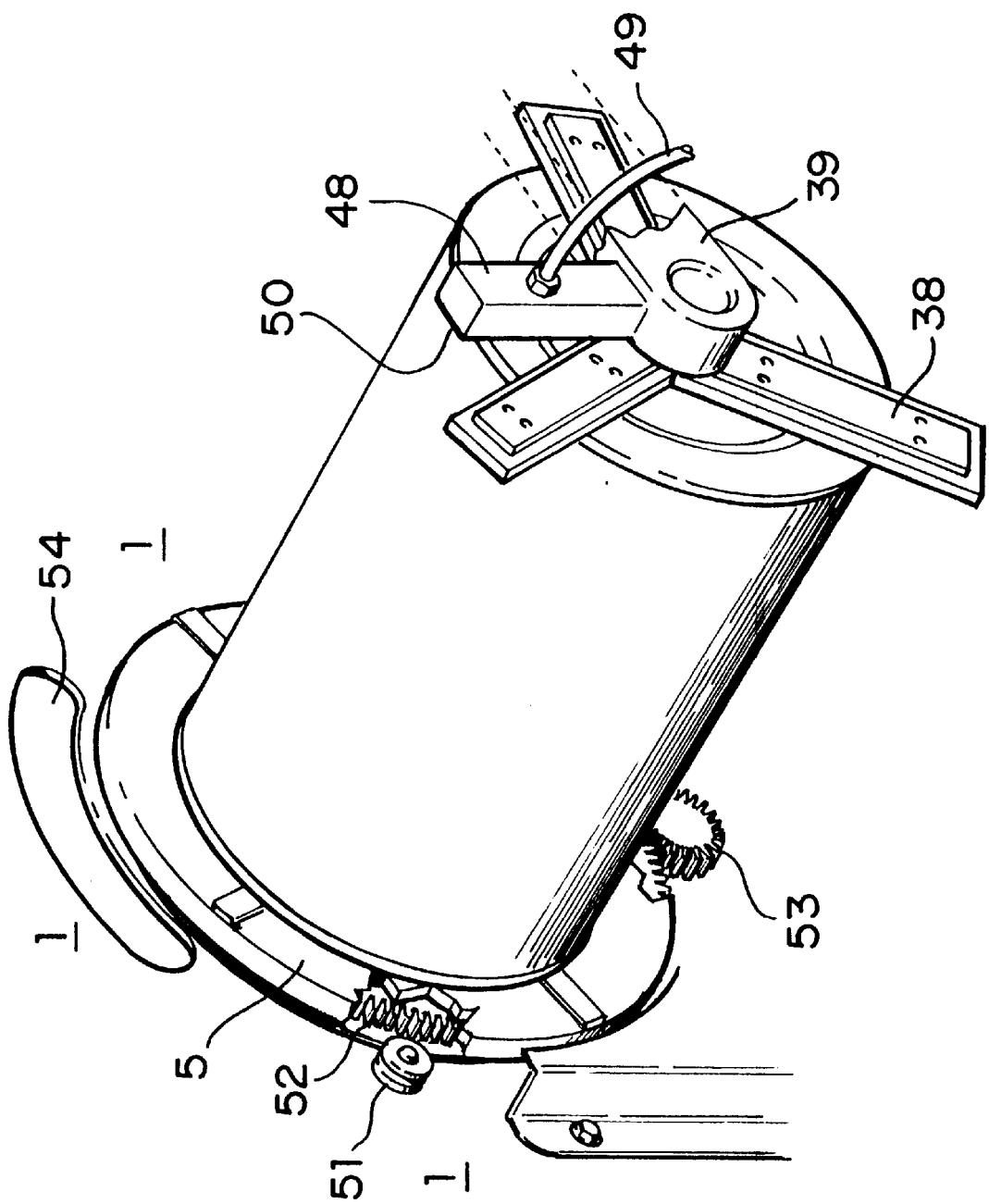
FIG. 7 is a perspective view of the filter after having been centered but engaged with a turntable.

FIG. 7 is a perspective view of the filter 20 after having made contact with the turntable 5. Turntable 5 is mounted in the fire wall 1 as seen in FIG. 1. The turn table 5 is rotatably supported in fire wall 1 by at least three guide wheels spaced around its circumference. The turntable itself is driven by a pinion 53 which meshes with the teeth of ring gear 52. the star wheel is freely rotating and will rotate with the filter as the filter is rotated by the turntable. An extension block 48 is provided on the support arm 39 for the star wheel 38 having a suction inlet 50 substantially at the circumference of filter 20. A suction hose 49 is fastened to the extension block 48 at a lower end thereof. The extension block 48 is of such a length so that there is always a suction at the circumference of any size filter, that is any diameter filter. The suction operation will be explained below as well as the crescent shaped openings 54 in fire wall 1.

Figure 8:
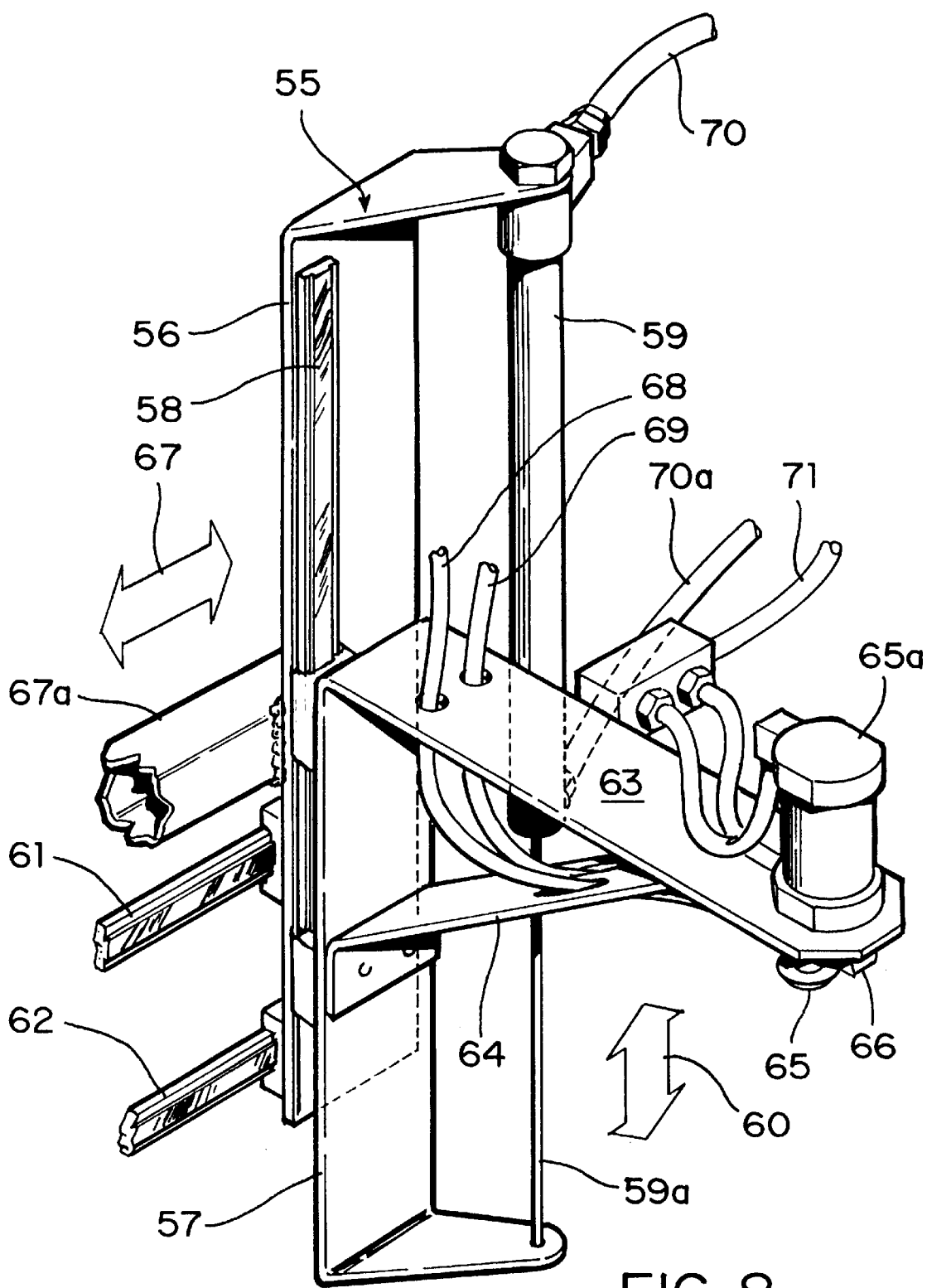
FIG. 8 is a perspective view of the outside vibrating hammer.

FIG. 8 is a perspective view of the outside vibrating hammer unit 55. The unit 55 consists of two telescoping segments 56 and 57 and they are guided relative to each other by a guide channel 58 so as to keep them properly aligned. To effect a telescoping movement, there is provided a piston 59 which is fastened at the top of telescoping segment 56. The piston 59 has a piston rod 59a extending therefrom which is fastened to the other telescoping segment 57. Thereby, when a signal provided to the piston 59, the two telescoping segments 56 and 57 are being moved relative to each other in an extending or contracting manner, which will be explained below. The unit 55 is slidable in a transverse direction as indicated by double arrow 67 and while it is moving, it is supported on guide channels 61 and 62. There is a support plate 63 extending from segment 57 having a support brace 64 for rigidity. At the end of support plate 63 there is mounted a vibrating hammer unit which is extending from and operated by piston 65a. At this location and below the support plate there is also provided an air pressure jet 66, its function will be described below. The lateral movement of the outside hammer unit is obtained by a beam 67a which is connected to the sliding platform 97 (FIG. 11) and follows its movement.

Figure 9:
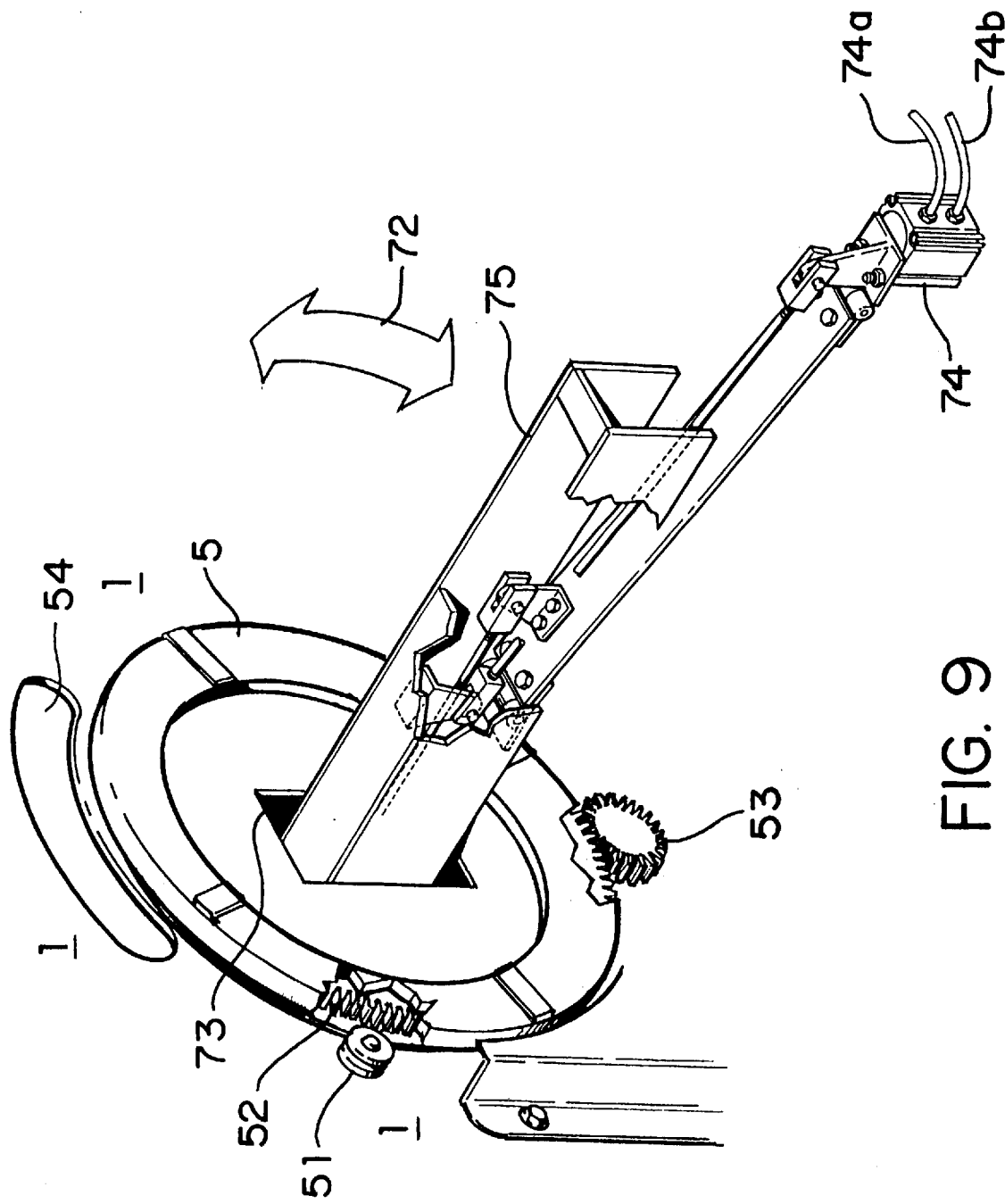
FIG. 9 is a perspective view of the inside vibrating hammer.

FIG. 9 is a perspective view of the inside vibrating hammer unit as opposed to the outside vibrating hammer unit as was just described above with reference to FIG. 8. The hammer unit 74 itself is supported by extending elements which always maintain the configuration of a parallelogram. This is necessary because the hammer unit 74 is moving up and down into different positions depending on the size of the filter, especially when operating on a conical filter, this way the hammer unit will always maintain an upright attitude. The lines 74a and 74b supply air and vacuum, respectively to the hammer unit 74. To this end, there is a support beam 75 extending through the center 73 of the turntable 5 and slidingly sealed therein.

Figure 10:
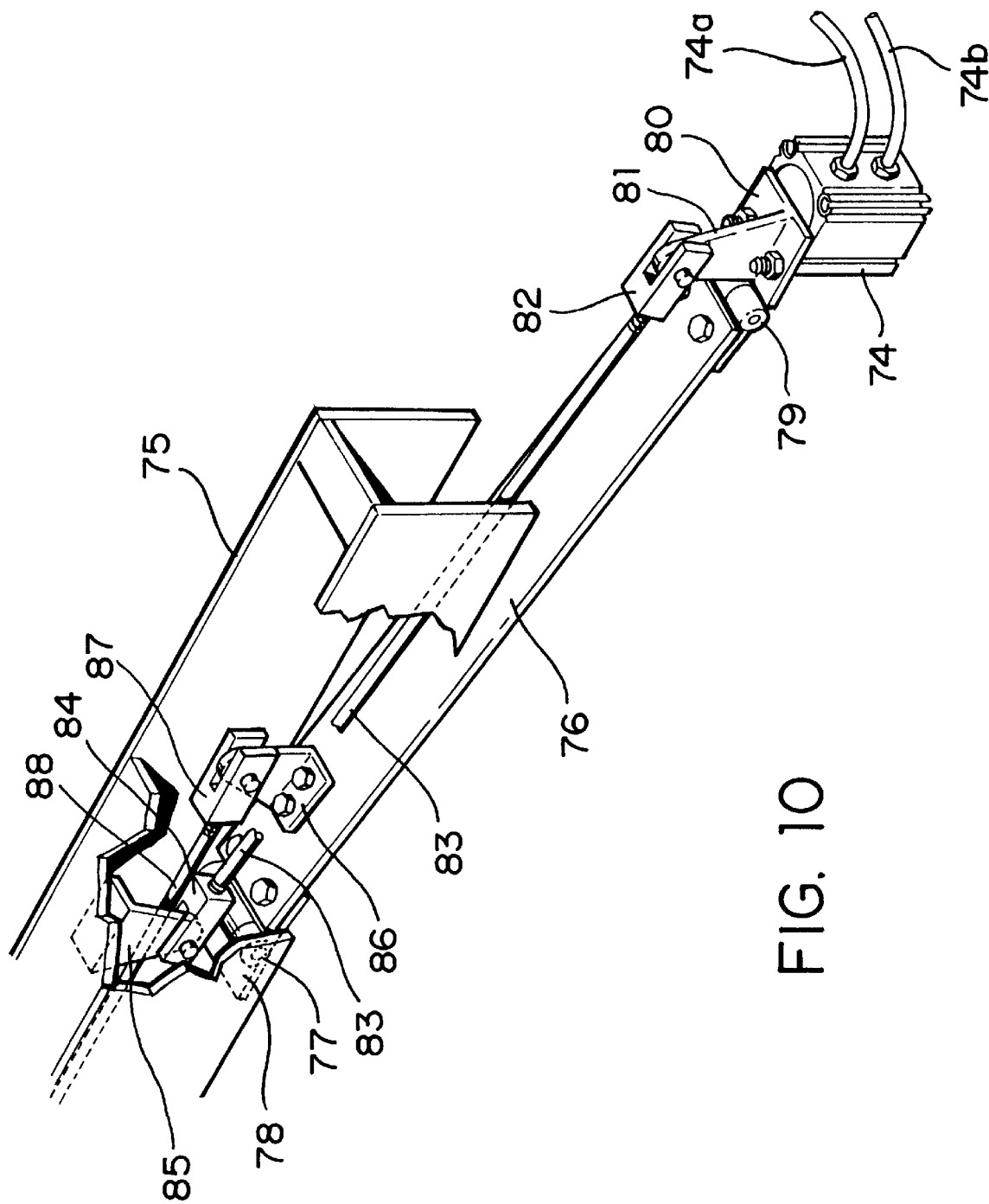
FIG. 10 is a perspective view of the linkage for the inside vibrating hammer.

Turning now to FIG. 10, a support plate 76 is hinged at 77 to the inside of the support beam 75 by way of an extension 78. At the forward end of the support plate 76 there is a further hinge 79 between the support plate 76 and a plate 80 to which the hammer unit 74 is attached. On plate 80 there is a clevis 81 to which a yoke 82 is hingedly attached. From the yoke 82 there extends a rod 83 which at its end carries another yoke 84 which is hingedly attached to a retaining plate 85 attached to the beam 75. Thereby, the elements 76, 81 83 and 85 will always maintain a parallelogram for the purpose enumerated above. On plate 76 there is attached a clevis 86 having a yoke 87 hingedly attached thereto to which is fastened a rod 88 extending to the left.

The movement of the hammer unit 74 will now be described by having reference to FIG. 11. At the lower left corner of FIG. 11 there is seen the left end of the rod 88 which at its other end is attached to the clevis 86 (FIG. 10). At the end of rod 88 there is a threaded section 88a and a nut 88b threaded thereon. The rod 88 passes through an elongated hole 90a in pivot lever 90 which pivots around pivot pin 91. Attached to the pivot lever 90 by way of pivot pin 93 is a further yoke 92 which is attached to a piston rod 96 which is being controlled by the piston 95. this mechanical arrangement constitutes a lost motion as will be explained below. The piston 95 is attached to the sliding platform 97 by way of a plate 97a and a pivot pin 97b. The piston 95 is operated by air hoses 94 and 94b which alternatingly apply air pressure to the inside of piston 95 to extend or retract the piston rod 96. As it does so, the support plate 76 will be lowered or raised while maintaining the hammer unit 74 in a perfect vertical position for the reasons explained above. The piston 95 does not apply any pressure to the hammer unit 74 after the hammer unit has made contact with the inside surface of the filter. As a matter of fact, the hammer unit is now free to move along the inside surface of the filter so that it follows all contours of the filter surfaces even or uneven or out-of-round. This is especially desirable when a conical filter is being cleaned. Since the rod 88 is freely slidable in the elongated hole 98a of pivot lever 90 and the piston 95 is deactivated, a lost motion is established at this point. The piston 95 only is used to deactivate the hammer unit 74 by the piston rod 96 pulling on one end of the pivot lever 90 while the end makes contact with the nut 88b to thereby pull the rod 88 to the left and to lift the hammer unit 74 away from the inside of the filter. It is also noted at this time that both hammer units (inside or outside) move in unison whenever a filter is being cleaned. The inside hammer unit is connected to the sliding platform 97 by way of the beam 75 and the outside hammer unit is connected to the sliding platform 97 by way of the beam 67a. However only one hammer is in operation at any one time which depends on which type of filter is being cleaned. The sliding platform 97 is adapted to slide in slide channels 98 and 98a and is driven by a pinion 99 on motor 101 meshing with the teeth on rack 100 attached to an upper frame of the apparatus. The motor itself has a clutch 102 incorporated therein to avoid any damage to machine parts in case of an overrun and also has a brake therein to assure an instant stopping at predetermined positions.

Figure 12:
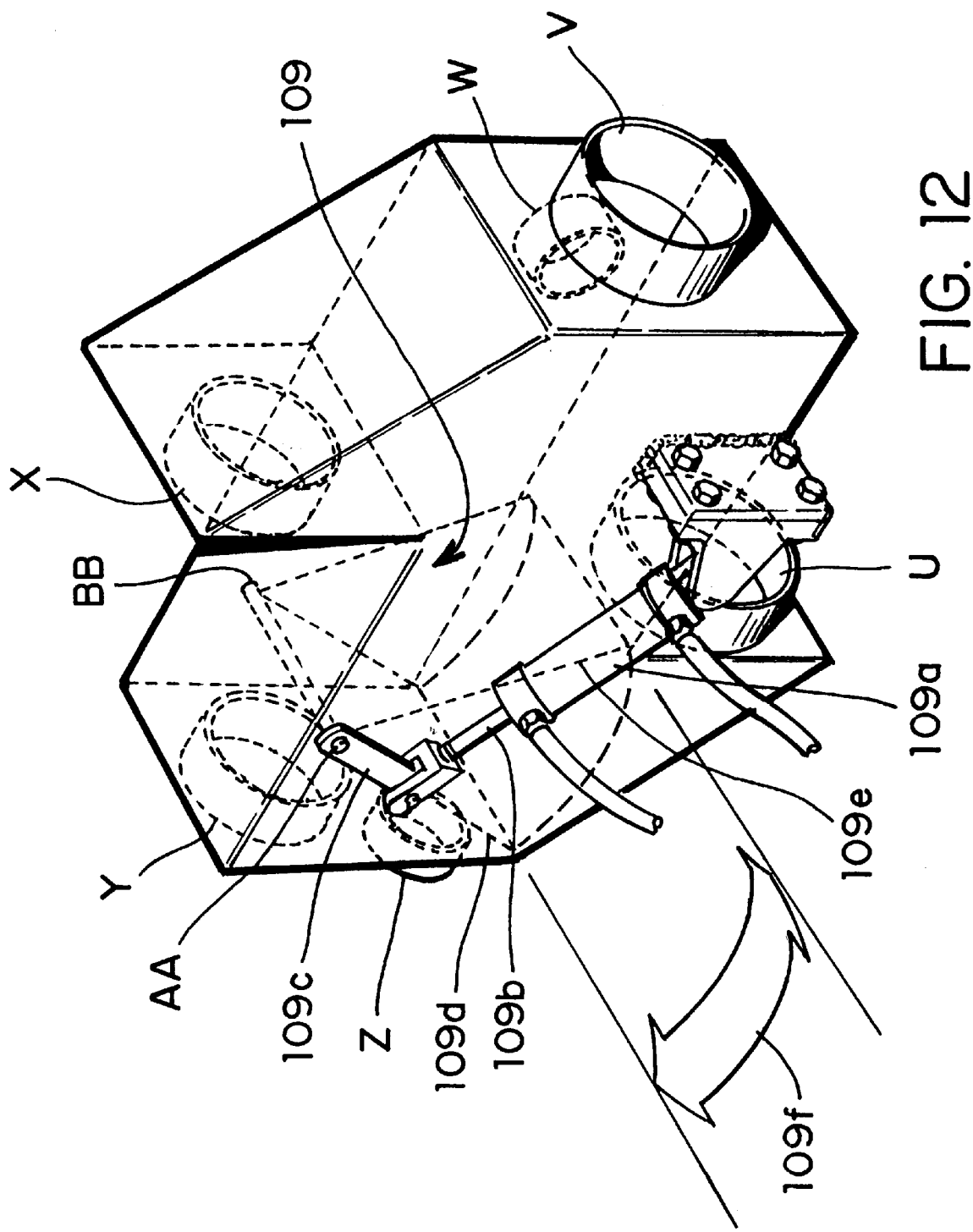
FIG. 12 is a perspective view of the vacuum directing manifold.

Turning now to FIG. 12, there is shown a perspective view of the manifold as identified as E in FIG. 1. The vacuum manifold has multiple ports marked U–Z. Instead of sketching in all the ducts and/or pipes, which would complicate the drawings, the ports will be described as to their purpose and what they will lead to. Therefore, the port U is the main suction port which is in piped connection with the suction pump 8 schematically shown in FIG. 1 and in FIG. 3, where the air pressure exit of vacuum pump 8 is ducted above the filter bag manifold 8c. The port V is in connection with star wheel 38 as identified at 49 in FIG. 7. The port W is connected to the bottom of chamber A and D where a brush-like auger is located for the purpose of suctioning any dirt and debris from that area. Port X is in connection with the crescent shaped openings 54 in fire wall 1, as shown in FIGS. 7 and 9. There may be 1 to 3 openings 54. Port Y is in connection with the center of turntable 5 as shown in FIGS. 1, 5 and 9. Behind the turntable 5 there is a box (not shown) which is hermetically sealed with the opening 73 shown in FIG. 9. The port Z is in connection with the inside cleaning hammer unit 74 as shown at 74b in FIG. 9. Inside the vacuum manifold there is located a baffle plate 109 which is hinged at AA and BB so that it can be moved by an air cylinder, schematically shown as 109a which is operating on the hinge AA–BB by way of a lever 109b. The operation of the vacuum manifold E will be described below in conjunction with the operation of the cleaning apparatus.

Figure 13:
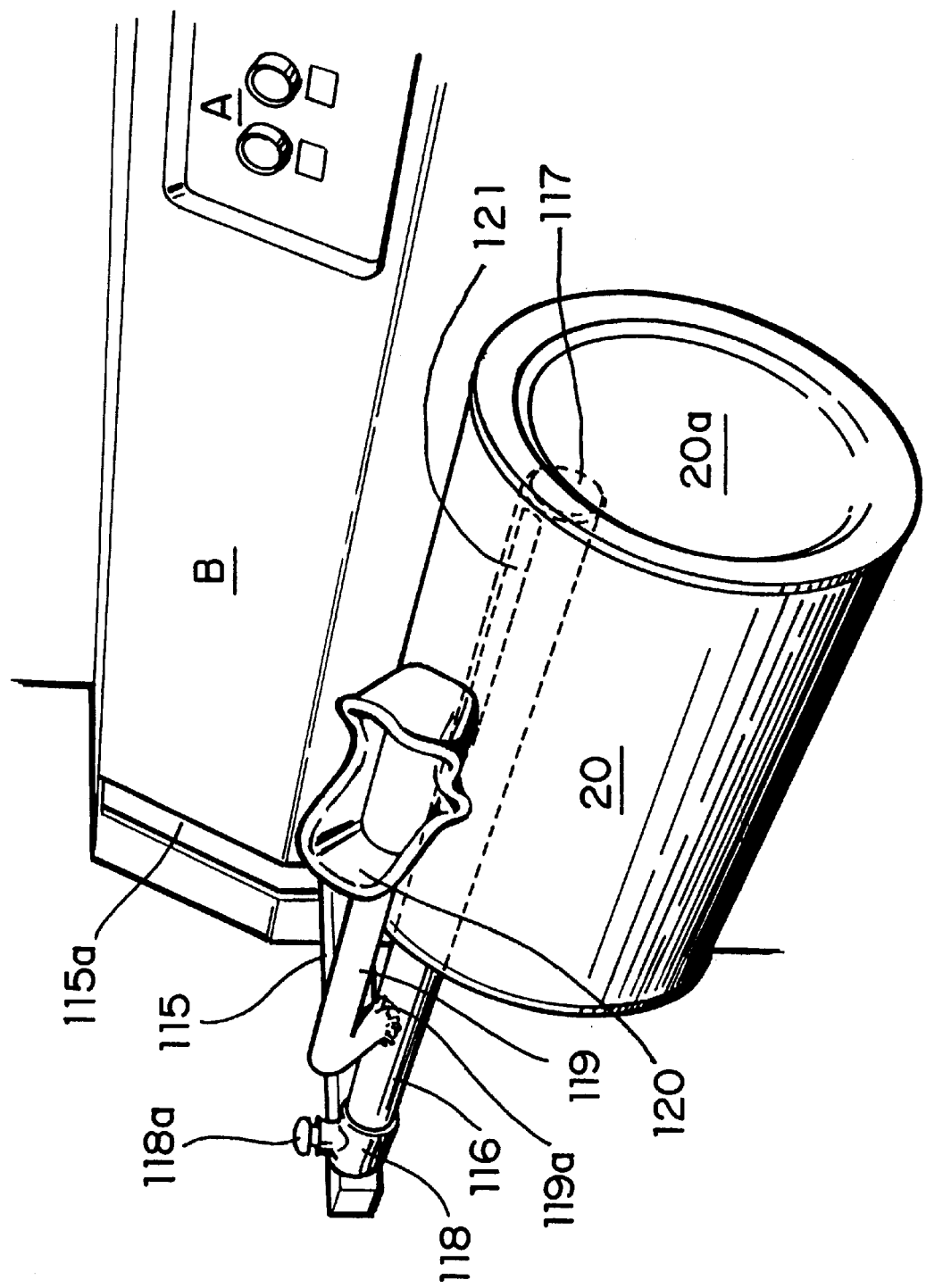
FIG. 13 is a perspective view of a filter inspection device.

Finally, turning to FIG. 13, there is shown a perspective view of a filter inspection device identified as 9 in FIG. 2. This inspection device could well be used separated from the apparatus, such as being mounted on a stand-alone frame, however, it is preferred to be a part of the apparatus. To this end, there is a pivotal support arm 115 which can swing in and out of a recess 115a at the left end of the apparatus. At the forward end of the support arm 115 is attached a horizontal rod 116 at 90° to the support arm 115. The rod 116 has an end 117. The rod 116 is mounted in a socket 118 and fastened therein by way of a set screw 118a. This mounting arrangement renders the rod adjustable by being able to turn within socket 118. The rod 116 has a further rod 119 extending in the same direction as 116, however with some distance which is determined by the support 119a. On the rod 119 there is mounted a goggle 120 which fits snugly around the eyes area of a user in order to keep outside light or stray light away from the eyes of a user. Embedded within rod 116 and flush with its circumference is a halogen light 121 which is also flush with the end of rod 117. Also in FIG. 13 there is shown a control panel 7 as identified in FIG. 2.

SUMMARY AND OPERATION OF THE INVENTION

When a filter is to be cleaned, it first must be determined whether the filter is dirty on the inside or on the outside. A mere visual inspection may suffice to make this determination. However, it is more important to determine whether the integrity of the filter medium has been maintained. for this purpose the filter 20 is being placed on the horizontally extending rod 116 all the way until the end 117 touches the inside of the filter end 20a, FIG. 13. The operator will adjust the goggles for the most convenient position by turning rod 116 in the socket 118 and then tighten the set screw 118a. When the light is switched on and by rotating the filter and/or by sliding it, the operator will now see whether there are any rips, breaks or holes in the filter medium, that is, the pleated filter paper. If any such faults are found, the filter should not be cleaned because it will fail otherwise.

For the following operation, it is assumed that the filter is dirty on the inside, although an operation for a filter that is dirty on the outside will also be described.

The clear view cover 6 in FIG. 1 will be slid to left to thereby expose the filter receiving chamber A, see FIG. 1. It is noted now that the control panel 7 is covered as long as the clear view cover 6 remains on the left side of chamber A so that the apparatus cannot be started. Turning now to FIG. 4, the filter is placed on the stationary support arms 21 and 21a. Next the operator will manually move the support column 36 as indicated by arrow 34 so that the pair of centering cradles 24 and 25 are aligned within the confines of the right end of filter 20. also a rack and pinion gear (not shown) can be used to accomplish the movement of column 36 by mechanical elements. There is contemplated a fail/safe detector (not shown) when this adjustment is overlooked, whereby the apparatus cannot be started. The cover 6 will now be closed to hermetically seal the chamber A whereby the control panel will be exposed and is ready for use. When the apparatus is now started, the top centering cradles 22 and 24 will now move downwardly while the lower centering cradles 23 and 25 will move upwardly. The approaching cradles are moved by the screw threaded shafts 29 and 30 which are threaded in opposite directions at their midpoint. This movement will stop as soon as the limit switches 33, 33a and 33b detect contact with the filter 20. The filter is now centered. as shown in FIG. 5. Next the filter 20 needs to be moved to the left by star wheel 38 on its support arm 39. It is noted at this point that the center of the star wheel, that is, its rotational center is always aligned with the rotational center of the turntable 5 regardless of what size filter is being used. The centering arms 22, 24 and 25 accurately make this alignment. The movement of the star wheel 38 is accomplished in the following manner by having reference to FIG. 6 and 11. As noted with reference to FIG. 6, the star wheel assembly is movable on guide channels 44 and 45 and to this end, the assembly by way of a connection 39a and 45a is connected to a piston rod 42 which leads to the left of FIG. 6. The piston rod 42 cooperates with a piston 42a (FIG. 11) which is attached to the machine frame itself.

Turning now to FIG. 12, the adjustments for the vacuum manifold E are now described. For this operation, it is assumed that the filter 20 is dirty on the inside. Therefore, the baffle 109 inside the manifold is moved to the 109d position so that suction is only applied to the center of the turntable opening 73 (see FIG. 9) and to the nozzle of the inside hammer unit. All other ports are being blocked. The outside vibrating hammer 65 in FIG. 8 is now activated including an air jet 66 which will jet onto the outer filter surface. In this manner, air simultaneously is sucked through the filter surface as well as pressed through the same. With the addition of the hammering action by the vibrating hammer, an extreme thorough cleaning action is achieved. It is to be noted that the hammer will always operate at the dead center of the filter. The suction lines carry the dirt and the debris that has been loosened through the vacuum manifold by port U, FIG. 12, through the vacuum pump 8, FIGS. 2 and 3, through its high speed air exit 8a in FIG. 3, through the duct 8b attached to 8a and then to the airbag manifold 13 above the suspended air bags 10. The air bag manifold 13 is suspended on rubber blocks 13a and is vibrated by a vibration motor 13b. The vibration of the manifold 13 will induce to loosen all dirt on the inside of the bags which will fall into the trough 15 below the air bag manifold 14 where the auger 16 driven by motor 17 will carry the dirt away. Meanwhile, the air escapes through the air bags 10 as clean air into the chamber 12a and from there through the filters 2 into the atmosphere. This then represents the operation of the apparatus wherein a filter is cleaned which is dirty on the inside.

The following description is directed to a filter that is dirty on the outside surface. It is a simple task to change the mode of operation by a selector on the control panel 7. When a filter is dirty on the outside, there will be a vacuum on the outside and a hammering operation on the inside. To this end, the position of the baffle plate 109 inside the vacuum manifold is moved to position 109d and will uncover the ports V W X whereby the port V applies a vacuum to the back of the star wheel 38 as shown at 49 in FIG. 7. The port W applies a vacuum to the bottom of chamber A and to the brush-like auger D operating therein. The port X applies a vacuum to the openings 54 located around the turntable 5 in the fire wall 1 between chambers A and B. The hammer unit 74, FIGS. 9 and 10 is now operating at the dead bottom center of the filter 10 with a vacuum applied to the outside of the filter 20 at both ends thereof. Fresh air is rushing into the inside of the filter through 73 or better yet through the opening of beam 75, FIG. 9, which is extending through the opening 73 of the turntable 5. The remainder of the operation is the same as explained above with reference to a filter being dirty on the inside, that is, the dirty air passes through the vacuum manifold E as shown in FIG. 12 and there beyond as explained already.

Therefore, the bottom line of this invention is that the air passes through the filter in the direction of where the dirt is, that is, if it is dirty on the inside, the cleaning air passes in that direction through the filter and if it is dirty on the outside, the air moves from the inside to the outside of the filter.

This, then distinguishes this invention from all other known devices in that others use a vacuum but not through the filter medium in one direction or the other.

It is also noted at this time that the apparatus is self-contained, that is all elements enumerated above are contained in one housing which makes it a stand-alone apparatus. See FIGS. 1–3.

What is claimed is:

1. An apparatus for cleaning air filters used in air breathing machinery including a filter medium having inside and outside surfaces that are either dirty on the inside surface or dirty on the outside surface, means for alternatingly applying a vacuum to the inside surface when the filter is dirty on the inside or for applying a vacuum to the outside surface of a filter when the filter is dirty on the outside whereby cleaning air passes through said filter medium in the direction of the surface that is dirty, including a housing enclosing said filter and said vacuum applying means making the apparatus a stand-alone unit, and means for hermetically sealing said filter within said housing against the ambient atmosphere during cleaning.

2. An apparatus as claimed in claim 1, including means for initially placing said filter into a chamber of said apparatus in a horizontal position, means for centering said filter relative to a rotatable turntable in a wall of said chamber, means for frictionally making contact between one end of said filter and said turntable and means for rotating said turntable and thereby said filter.

3. An apparatus as claimed in claim 1, including at least two vibrating hammers adapted to operate on both surfaces of said filter, only one vibrating hammer operating on the outside surface of said filter when the filter is dirty on the inside surface and the other vibrating hammer operating only on the inside surface when the filter is dirty on the outside surface.

4. An apparatus as claimed in claim 3, including at least two air jets adapted to operate in conjunction with said vibrating hammers with each emitting a jet stream of air, one of said air jets operating to emit a stream of air onto the outside surface of said filter when said filter is dirty on the inside surface and the other jet is emitting a stream of air to the inside surface of said filter when the filter is dirty on the outside.

5. An apparatus as claimed in claim 3, wherein said inside vibrating hammer is hingedly supported on a support beam extending through a center of said turn table including means for always maintaining said hammer in a vertical orientation when said hammer is moved either vertically or horizontally.

6. An apparatus as claimed in claim 5 including four elements hingedly connected to each other and forming a parallelogram to which is connected the vibrating hammer, said parallelogram is the means for maintaining said vertical orientation.

7. An apparatus as claimed in claim 1, including a vacuum manifold having multiple vacuum ports therein including a movable manifold baffle plate adapted to open some of said vacuum ports and cover the others when in one position and further adapted to cover the previous open vacuum ports and open the previous closed vacuum ports when being placed in the other position.

8. An apparatus as claimed in claim 7, wherein said vacuum manifold has at least one port connected to an inlet of a vacuum pump having a high speed air outlet which is ducted to a manifold having a multiple of air bags suspended therefrom, means for vibrating said air bag manifold, whereby the dirt entrained in the air stream will fall into a further chamber below the air bags while the air is escaping through the air bags.

9. An Apparatus as claimed in claim 8, including an auger placed in said further chamber to carry away dirt accumulated therein.

10. An apparatus for cleaning an air filter having a filter medium therein, said apparatus comprising: a housing having first and second chambers, said chambers being hermetically sealed from each other by a fire wall there between, a turntable mounted in said fire wall, means for rotating said turntable, a filter placed in an initially horizontal position in said first chamber, means for centering the filter with respect to said turntable, means for frictionally making contact of one end of said filter with said turntable to be rotated thereby, means for alternatingly establishing a vacuum on the inside of said filter when the inside surface of said filter is dirty or on the outside of said filter when the outside surface of said filter is dirty, whereby the cleaning air moves through said filter medium in the direction to the surface where the surface is contaminated.

11. The apparatus as claimed in claim 10, wherein a clear view sliding door hermetically closes the first chamber and there is a control panel arranged on the outside of said chamber and wherein said clear view door is of a size so that it always covers the control panel when open and allows access to said panel when it is completely closed.

12. The apparatus as claimed in claim 10, wherein all operating elements of the apparatus are all contained in said housing making it a stand-alone and self-contained housing.

* * * * *